United States Patent [19]

Blackstone

[11] Patent Number: 5,298,120
[45] Date of Patent: Mar. 29, 1994

[54] COMPOSITION FOR ENHANCING THE PULPING OF WOOD CHIPS

[76] Inventor: Michael Blackstone, P.O. Box 260, Ridgeland, S.C. 29936

[21] Appl. No.: 896,060

[22] Filed: Jun. 9, 1992

[51] Int. Cl.$^5$ .............................................. D21C 3/20
[52] U.S. Cl. ...................................... 162/76; 162/72; 162/164.1; 252/174.22
[58] Field of Search ................. 162/72, 75, 76, 164.1, 162/168.1, DIG. 3, DIG. 4; 252/174.22

[56] References Cited

U.S. PATENT DOCUMENTS

| | | |
|---|---|---|
| 3,036,118 | 5/1962 | Jackson et al. |
| 4,673,460 | 6/1987 | Raff .............................. 162/DIG. 4 |
| 4,906,331 | 3/1990 | Blackstone et al. .................... 162/72 |
| 4,952,277 | 8/1990 | Chen et al. ............................ 162/77 |
| 5,032,224 | 6/1991 | Ahluwalia .............................. 162/72 |

*Primary Examiner*—W. Gary Jones
*Assistant Examiner*—Dean T. Nguyen
*Attorney, Agent, or Firm*—Dority & Manning

[57] ABSTRACT

A novel composition for use in a process for cooking wood to form pulp and processes for using same are provided. The composition and variations thereof are useful in enhancing the uniformity of wood cooking and reducing the rejects in a pulping process for the production of pulp. The composition comprises esters of block copolymers having the general formula $$HO(CH_2CH_2O)_x(CHCH_2O)_y(CH_2CH_2O)_zH$$
$$|$$
$$CH_3$$

wherein x, y, and z each have a value of at least one.

7 Claims, No Drawings

COMPOSITION FOR ENHANCING THE PULPING OF WOOD CHIPS

FIELD OF THE INVENTION

A composition and process for producing paper from pulp, and more particularly for producing wood pulp by the sulfate pulping process for subsequent use in making paper products, are provided.

BACKGROUND OF THE INVENTION

The majority of corrugated boxes, paper grocery bags, fine papers, and market pulps are produced by a sulfate pulping process known as "Kraft" pulping. The process is characterized by the fact that sodium sulfide is added to the medium that is used to cook the wood chips and produce pulp. When this technique was introduced over a century ago, the addition of sodium sulfide produced a dramatic improvement in pulp strength, pulp yield, and durability of the paper made therefrom.

In the typical Kraft digestion process, wood chips are added to an aqueous medium consisting mostly of white liquor which will be transformed into black liquor during the cook. In general, the liquor in which the wood chips are cooked, or cooking liquor, comprises a mixture of black and white liquor, the black liquor being liquor added back to the cooking vessel, or digester, from a prior batch of wood chips and the white liquor being a freshly prepared alkaline solution as described below. Black liquor varies considerably among different mills depending on the white liquor used, the wood employed, and the method of cooking. Typical white liquor is a solution of sodium hydroxide, sodium carbonate, sodium sulfate, sodium sulfide and various inorganic materials. White liquor solubilizes the pulp and removes the lignin from the wood fibers as described below.

The largest part of the organic matter removed from the wood during cooking is combined chemically with sodium hydroxide in the form of sodium salts. Some of these compounds are resin soaps which account for the intense foaming properties of black liquor. In addition, organic sulfur compounds and mercaptans, which give the characteristic odor to the sulfate-containing black liquor, and small amounts of sodium sulfate, silica and other impurities such as lime, oxide, alumina, potash, and sodium chloride are present in the black liquor.

In the pulping process, pre-sized wood chips are subjected to the alkaline reagents at elevated temperatures and pressures in a digester vessel. Generally, temperatures range from about 250° F. to about 350° F. and pressures range from about 60 psi/g to about 130 psi/g. Digestion time may range from 30 minutes to 10 hours, depending on the process conditions and the desired pulp/paper characteristics.

The reaction conditions present during the cook, or digestion, cause lignin—the amorphous polymeric binder found in wood fibers—to be hydrolyzed. Ideally, wood chips are digested only long enough to dissolve sufficient lignin to free the cellulosic wood fibers but maintain sufficient lignin intact to provide added strength to the paper. The pulping process attempts to maximize pulp yield, which is defined as the dry weight of pulp produced per unit dry weight of wood consumed.

After sufficient lignin has been dissolved to free the cellulosic wood fibers, the digester charge is blown into a receiving vessel, or blow tank. The sudden drop in pressure from the digester to the blow tank causes additional mechanical breakup of the wood fibers. In some papermaking applications, the residual lignin is removed to produce papers without the characteristic brown color of Kraft paper. In producing linerboard or Kraft paper, however, the lignin residue remains in the papermaking pulp so that the highest possible strength of wood pulp is achieved.

Ideally, each of the wood chips blown from the digester into the blow tank is broken down into separate wood fibers. In practice, however, some of the wood chips fail to completely separate due, in part, to the undissolved lignin remaining in the pulp. These unseparated particles are removed from the wood pulp by passing the pulp through a screen having openings of a predetermined size. In the pulping industry, the standard test screen employed is flat with 0.01 inch slots therethrough.

The materials that are recovered by this screening process are known as "rejects". The rejects include wood fibers that could be used to produce paper. Accordingly, it is highly desirable to decrease the amount of rejects. One method of lowering the amount of rejects is by increasing the digestion time or by creating more severe hydrolysis conditions. Such conditions, however, increase the costs involved and cause some of the cellulose in the wood chips to be hydrolyzed and rendered unusable.

After contact with liquor in the digester, inorganics, any unused surfactants that may have been added, and solubilized lignin and resins are removed from the pulp in one or more washing steps. Temperatures in the digestion and washing stages typically vary from about 250° F. to 340° F. and 100° F. to 200° F., respectively. After washing, the pulp may be subjected to further bleaching or purification treatments as desired before being sheeted and dried, or prepared for sale, or further utilized in making paper.

A Kappa number corresponds directly to the amount of lignin remaining in the pulp. Generally, the higher the Kappa number, the more lignin present in the pulp and, therefore, the higher the pulp yield. The Kappa number generally decreases as the digestion time is increased or the alkalinity of the cooking liquor is increased. The goal in such Kraft papermaking processes is to retain as much lignin as possible in order to enhance strength and to reduce the cost, while maintaining the uniformity of the cook. More uniform cooks result in a decreased percentage of rejects and, thereby, reduce costs for running paper mills.

Cooking, or digestion, of the pulp may be terminated when the amount of rejects in the pulp is reduced to an acceptable level. Substantial yield and quality advantages are achieved if the wood chips are cooked to a higher lignin content. As a result, an increase in a Kappa number target by the use of thinner chips can result in a substantial cost savings. However, the thickness of chips obtainable on a commercial scale is always variable. A major portion of the total rejects frequently originate from a relatively small fraction of the chips having the greatest thickness. The objective in every pulping process is to achieve a lower percentage of rejects.

In recent years, various surfactants have been added to the pulp cooking medium to increase deresination of the wood pulp. Deresination removes various resins found in wood, including lignin, tannins, and organic solvent-extractable materials, such as fats, fatty acids, resin acids, sterols and hydrocarbons. U.S. Pat. No. 4,426,254 to Wood et al. describes a $C_{12}$-alpha olefin sulfonate or $C_{21}$-dicarboxylic acid as a solubilizing agent in combination with a deresination agent consisting of sodium hydroxide and an ethylene oxide condensation product. The composition removes resins so that fouling of process equipment and foaming in process streams are reduced. Moreover, deresination provides for production of high grade cellulose which may be used in various manufactured cellulose-containing products. Another deresination agent is described in U.S. Pat. No. 2,999,045 to Mitchell et al. as a block copolymer of polyethylene oxide and polypropylene oxide. Such block copolymers as described therein are manufactured and sold under the names PLURONIC L-44, PLURONIC L-62, PLURONIC L-64 and PLURONIC F-68.

A process for enhancing the cooking of wood chips for producing pulp is described in U.S. Pat. No. 4,906,331 to Blackstone et al. As described therein, a block copolymer of polyethylene oxide and polypropylene oxide having a molecular weight of from 500 to 30,000 is added to the pulp cooking liquor to form a Kraft pulp. The polyethylene oxide portion of the block polymer described therein is present in the reagent in an amount of from about 20% to about 80%. Such surfactants are sold by BASF Wyandotte Corporation (hereinafter "BASF") under various tradenames including PLURONIC L-62, PLURONIC L-92 and PLURONIC F-108.

The particular block copolymer surfactants described in the '331 patent have been found to be only partially soluble in both highly alkaline solutions such as white liquor and in low alkaline solutions such as weak black liquor having alkali concentrations as low as 5 grams per liter. Lab work has also shown that a waxy precipitate often forms on the surface of hot white liquor when the surfactant described by the '331 patent is employed.

U.S. Pat. No. 4,952,277 to Chen et al, describes a process for making paper and linerboard employing a phenoxy ethyleneoxy alcohol surface active agent. The particular agent described therein is sold under various names such as IGEPAL ® RC-520, TRITON ® X-100, and SURFONIC ® N-95 sold by GAF Corp., Rohm and Haas Co. and Texaco Chemical Co., respectively. The patent discloses that the surface active agent may be used in combination with the ethylene/propylene block copolymer described in the '331 patent.

Anthraquinone is another reducing agent that has been used as an alternate to sodium sulfide in the Kraft pulping process. The expense of anthraquinone prevents its use by most paper mills. Some of the previously mentioned surfactants, including the block copolymers, have, however, produced a synergistic effect when employed in combination with anthraquinone.

Although various agents and processes have been employed to enhance the cooking of wood pulp as well as to cause deresination, the particular features of the present invention have not heretofore been known. The prior art is generally deficient in affording the stable and soluble composition and process described herein for producing a reduction in pulp rejects and an increase pulp yield. The present invention overcomes the shortcomings of the prior art in that the composition and process disclosed herein result in lower processing costs, easier operational procedures, and increased yield of pulp recovered from various wood sources.

SUMMARY OF THE INVENTION

It is an object of the present invention to provide a composition and process for improving the cooking of wood chips during the production of pulp for making paper.

It is an object of the present invention to provide a composition and process for enhancing cooking uniformity of wood chips for producing pulp by the Kraft pulping process.

It is another object of the present invention to provide a composition and process for increasing the yield of pulp produced per ton of wood chips.

It is another object of the present invention to provide a composition and process for reducing the amount of cooking liquor required to produce pulp.

It is further another object of the present invention to provide a composition and process for reducing the amount of energy required to produce pulp from wood chips.

It is a further object of the present invention to provide a composition and process for reducing the amount of solids contained in the black liquor of a pulping process.

It is another object of the present invention to provide a composition and process to decrease the amount of rejects produced during production of pulp.

It is further another object of the present invention to provide an economical and efficient process for producing pulp from wood.

It is further another object of the present invention to provide a composition and process to decrease the impact of the Kraft pulping process on the environment and reduce the cost of treating waste materials produced thereby.

Generally speaking, the present invention is directed to a composition and process for producing pulp from cellulosic materials such as wood chips. The process employs a surfactant that delivers the proper characteristics to the cooking liquor and in a form soluble at digester conditions. When the composition described herein is added to the cooking liquor, uniform distribution of the cooking chemicals and/or the removal of degraded materials from within the chips is enhanced, resulting in a lower production of rejects and higher pulp yields.

Broadly speaking, the present invention comprises esters of ethylene oxide-propylene oxide block copolymers. The ethylene oxide-propylene oxide esters may be added to a pulping process either before or during digestion of wood chips. Generally, the present digester additive employs the reaction products of a fatty acid and a blend of block polymers having the general formula

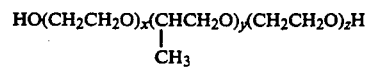

wherein x, y, and z are integers having a value of 1 or more. Both saturated and unsaturated fatty monoacids and diacids having between about 4 and about 22 carbon atoms may be used to form the esters.

In one particular embodiment, about 45% by weight of a block polymer having the general formula above and sold by BASF under the name PLURONIC L-62 and about 45% by weight of a block polymer sold by BASF under the name PLURONIC F-127 are combined with about 9% by weight oleic acid and about 0.15% by weight of a suitable catalyst such as p-toluene sulfonic acid. The components are heated with agitation under a nitrogen blanket at about 180° C. to about 220° C. until the acid value, in mg KOH per gm sample, is less than about 5.0.

DESCRIPTION OF PREFERRED EMBODIMENT

By way of example only, the process of the present invention is described as employing oleates of ethylene oxide/propylene oxide block copolymers. Moreover, by further example, the oleates are described as being used in a Kraft pulping process. The invention, however, is not to be so limited. Any of the various compositions equivalent to the esters described may be employed in any equivalent wood cooking process having the production of paper as its ultimate goal.

The esterified product is produced as follows. The block copolymers used in the present composition are copolymers of polyethylene oxide and polypropylene oxide and are represented by the general formula

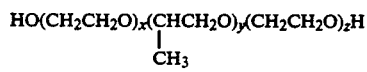

in which x, y, and z are integers having a value of 1 or more. The block copolymers are generally described in U.S. Pat. No. 2,999,045 and U.S. Pat. No. 4,906,331, which are incorporated herein in their entirety by reference. Such block copolymers are manufactured and sold by various companies. For example, BASF sells this line of block copolymers under the name PLURONIC with designations such as PLURONIC L-44, PLURONIC L-62, PLURONIC L-64, PLURONIC F-68, PLURONIC F-108, and PLURONIC F-127. Each of x, y and z have values of at least one but are generally in a range so as to produce a polymer having a molecular weight of from about 500 to about 30,000. The molecular weights herein were determined by a review of the available literature regarding PLURONICS.

In the present composition, any number of different block polymers having the general formula above may be utilized. For example, a block polymer having a molecular weight of about 2,500 and comprising about 20% polyethylene oxide and about 80% polypropylene oxide and sold by BASF under the name PLURONIC L-62 may be esterified and employed with the ester of a block copolymer having a molecular weight of about 12,600 and comprising about 70% polyethylene oxide and about 30% of polypropylene oxide and sold by BASF under the name PLURONIC F-127.

To produce the esterified version of the block copolymers, any fatty acid may be used. Particularly, the saturated and unsaturated fatty acids having between about 4 and about 22 carbon atoms, such as maleic acid, stearic acid, adipic, abietic, linoleic and oleic acid, are preferred for esterifying the block copolymers.

The esterification process involves combining the block copolymers with a fatty acid in the presence of a catalyst. The mixing vessel is agitated under a nitrogen blanket during heating in the range of about 180° C. to about 220° C. Esterification is substantially complete when an acid value (mg KOH/gm) less than about 5.0 is obtained. Of course, other methods of esterification may be employed for producing the composition and the invention described herein is not limited to any esterification particular method.

The present composition may be employed according to the following steps in a process for cooking cellulosic products, such as wood chips, to obtain pulp for producing paper. Preferably, the present composition is added at diluted strength (about 15%) to the white liquor after the liquor is diluted to a strength appropriate for the Kraft cook. The present composition can also be added to a mixture of white and black liquor or black liquor only, or it can be used in treating the wood chips prior to adding the wood chips to the cooking liquor. After the wood has been digested to form a pulp slurry according to the present invention, and washed to remove the inorganics and dissolved organics, the pulp slurry is then provided to a papermaking machine. Paper may then be produced from the pulp slurry according to known procedures of papermaking. Although the specific percentages and process parameters described herein are preferred, other percentages and parameters may be utilized.

The present invention may be better understood by reference to the following examples.

EXAMPLE 1

A composition of the present invention was produced according to the following method. Oleic acid esters were formed from a blend of copolymers of polyethylene oxide and polypropylene oxide having the general formula

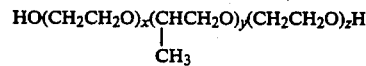

wherein x, y, and z are integers having a value of at least 1. For this particular Example 1, 45.23% by weight of a block polymer sold by BASF under the name PLURONIC F-127 and 45.23% of a blocked polymer sold by BASF under the name PLURONIC L-62 were combined into a mixing vessel with 9.39% by weight of oleic acid. P-toluene sulfonic acid in amount of 0.15% was added as a catalyst to effect esterification. The mixing vessel was then heated and agitated under a nitrogen blanket at about 180° C. to about 220° C. until the acid value of the composition in mgKOH/gm was less than 5.0.

EXAMPLE 2

Pulp was produced from wood chips according to the present process by employing the composition of Example 1 as follows. Typical white liquor as described above was filtered through a 2-micron glass fiber filter to remove particulants contained therein. A portion of the filtered white liquor was diluted to a strength of 5 grams per liter of titratable alkali to simulate weak black liquor. One hundred parts per million of the composition made according to Example 1 was added to the white liquor at a temperature of about 210° F. The composition exhibited both solubility and stability in the cooking medium, which enables addition of the additive to continuous digesters, white liquors, or black liquors containing residual alkali.

EXAMPLE 3

For comparison purposes, the cooking aid described in U.S. Pat. No. 4,906,331 to Blackstone et al. was formulated as 8% PLURONIC L-62 and 8% PLURONIC F-108. One hundred parts per million of the non-esterified cooking aid was added at 210° F. to a portion of the diluted filtered white liquor described above. When adding the cooking aid of the '331 patent, a waxy precipitate formed and floated to the surface of the cooking liquor. When the oleate of Example 1 was added to the white liquor, the liquor clouded slightly, but otherwise remained stable and did not produce a waxy precipitate.

A Draize test was performed on the liquors of Example 2 and Example 3 as well as on a control sample of the weakened white liquor containing no additives. A Draize test indicates the potential wettability of cellulosic fibers by the cooking liquor and is performed by measuring the time for a cottonball to become completely saturated, as indicated by sinking in the test vessel. In the white liquor control, 9.6 seconds were required to saturate the cottonball, 4.9 seconds were required to saturate the cottonball in the solution of Example 3, and less than 1.0 seconds were required to saturate the cottonball using the inventive composition-containing liquor of Example 2.

In addition, a wicking test was performed on each of the three samples to determine wicking penetration and wettability. In performing a wicking test, a cellulosic paper blotter about 90 mills thick is immersed in a solution. The wicking test conducted on the weakened white control liquor showed different visible bands on the blotter, indicating the presence of sodium hydroxide and sodium sulfide. Such distinct bands suggest that the components of the white liquor solution are absorbed into the chips at different rates. The control white liquor cellulose blotter produced a wicking band of 0.7 inches after five minutes, the liquor of Example 3 showed a wicking band of 1.1 inches after five minutes and the liquor containing the present composition made according to Example 2 showed a wicking band of 1.6 inches after a five minute period. Moreover, when the present composition was employed, no separate bands indicating different rates of absorption for sodium hydroxide and sodium sulfide were observed. An absence of such bands suggests the potential for a more uniform cooking of the wood chips when the composition of Example 2 is employed.

Comparative production scale tests for producing pulp from pine were conducted using various additives in the digester cooking liquor. In the production scale tests of Examples 4-6, no screening capability for removing wood chip fines or oversized chips from the pulp was available at the production mill. During normal runs at the production test mill with this particular type of pine pulp, standard 0.01 inch flat screen rejects had averaged 48% at a Kappa number of 104.

EXAMPLE 4

For comparison purposes, the cooking aid containing the block copolymers described in the '331 patent was introduced to the black liquor cooking mediums at a rate of 0.03% based on the weight of oven-dried wood chips. The average rejects were reduced to 37% at a Kappa number of 104.

EXAMPLE 5

The composition of Example 1 was added to the digester black liquor at 0.03% based on the weight of oven-dried wood chips. After digestion, the pulp of this Example 5 contained 22% rejects at a Kappa number of 104. These particular rejects were soft and pliable and were easily handled without disturbing the machine runnability of the system. During continued runs for 12 hours during 18 separate cooks, Kappa numbers averaged 104 and the pulp averaged 22% rejects, without any operational problems.

During the runs, the pulp yield increased even though the average Kappa numbers remained at 104 for most of the trial. Operation of the brown stock washers also improved. First stage washer efficiencies increased from 85% to 99% and the second stage filtrate solids dropped from 3.6% to 1.9%. The washer drum speed was reduced from 4.2 rpm to 1.5 rpm, indicating improved drainage. Moreover, paper machine defoamer usage dropped steadily throughout the trial runs, indicating a reduction in carry-over solids.

EXAMPLE 7

A long term production scale test was conducted using the composition of Example 1 added to the digester cooking liquor at the mill where the runs of Examples 5 and 6 were conducted. The composition of Example 1 was added to the digester liquor as a 15% solids emulsion at a rate of 2.6 pounds per ton of wood chips. The pulp production rate of the runs was 640 tons of oven-dried pulp per day.

During the runs, digester production increased from the normal 15.45 tons per cook to 16.31 tons per cook. (Because wood chip moisture varies from 47% to 53%, all the results discussed herein are corrected to 50% moisture.) By maintaining pulp production at a constant rate of 640 tons per day, the following benefits were realized: (1) wood chip requirements were reduced by 116 tons per day; (2) the amount of cooking liquor required was reduced by 18,500 gallons per day, or 8,500 gallons per cook; (3) the amount of cooking steam required was reduced by 67,500 pounds per day, or 31,000 pounds per cook; (4) 1,216 gallons of fuel oil per day, or 1,703 therms of natural gas, were saved; and (5) black liquor solids were reduced by 46 tons per day.

Although the use of the composition of Example 1 produced consistently higher yields than normal pulping processes, the traditionally-sacrificed qualities of pulp appearance, color, strength, and machine runnability did not suffer. During the production trials, each measured quality improved significantly compared to cooking liquors without additives and when compared with cooking liquors employing the non-esterified block copolymers described in the '331 patent. Paper machine speeds and production equalled or bettered other production runs not employing the composition of Example 1. Washer operation improved measurably as evidenced by a 30% reduction in brown stock washer defoamer and a 20% reduction in paper mill defoamer requirements.

Mullen, ZDT, STFI, porosity, and smoothness tests were conducted on papers produced from pulp cooked with the composition of Example 1 as described in Example 7 and compared with paper produced from pulp cooked without additives as run normally at the mill described in Example 7. A Mullen test measures bursting strength of paper fibers, with higher numbers indicating the desired higher bursting strengths. A ZDT test measures the detrimental capability to tear layers of paper. The higher the ZDT number, the stronger adherence between layers. A porosity test measures air flow in terms of the number of pores in the paper. The higher the porosity test number, the fewer pores found within the paper and, therefore, the stronger the paper. A smoothness test is self-explanatory. An STFI test is a stacking strength test where higher numbers indicate an increased capacity of the paper to be stacked. As shown in Table 1 below, use of the composition of Example 1 as an additive to the cooking liquor improved four of the five tested characteristics when compared with papers produced in a normal base cooking liquor without the additive.

TABLE 1

|  | MULLEN | ZDT | POROSITY | SMOOTH-NESS | STFI |
|---|---|---|---|---|---|
| Without Example 1 | 199.2 | 42 | 14.5 | 400 | 21.2 |
| With Example 1 | 101.5 | 5 | 15.5 | 400 | 22.6 |

Moreover, the waste materials produced during papermaking were significantly reduced when the composition of Example 1 was employed. Soda loss was reduced which, in turn, reduced sulfuric acid required for pH control. Moreover, organic wastes, as measured by the biological oxygen demand, were reduced by 30%. Such reductions minimize the impact of pulping on the environment and also reduce the cost involved in treating such wastes.

During the production scale trial runs of this Example 7, the amount of oven-dried chips required to produce oven-dried pulp decreased significantly. When no additives were added to the cooking liquor, 1.77 tons of oven-dried chips were required to produce 1.00 ton of oven-dried pulp; when employing the composition of Example 1, only 1.70 tons of oven-dried chips were required to produce 1.00 ton of oven-dried pulp. This increase in yield resulted in a wood chip savings over the pulping process normally conducted at the mill of $4.80 per ton.

EXAMPLE 8

During another production scale test run, the composition of Example 1 was introduced to the digester liquor as described in Example 3 at a rate of 2.60 pounds per ton of wood chips. The pulp slurry made thereby contained 0.01 flat screen rejects of 20% at 104 Kappa. The highest rejects recorded were 44% at 118 Kappa. As with all runs employing the inventive composition, the rejects were soft and pliable and were handled easily without upsetting the running of the paper production system. Kappa numbers averaged 114 for twelve hours (18 cooks) and averaged 42% rejects, again with no operational problems.

EXAMPLE 9

A further production scale test was conducted as described in Example 7 at a constant pulp production rate of 640 tons of oven-dried pulp per day. The composition of Example 1 was fed to the digester as a 15% solids emulsion at a rate of 1.75 pounds per ton of pulp for 15 days. Digester production increased from 15.45 tons per cook to 16.27 tons per cook during constant loading of oven-dried wood. Based on constant pulp production of 640 oven-dried tons per day, the following advantages over a normal no-additive production process were observed: (1) wood chip requirements were reduced by 116 tons per day; (2) the amount of cooking liquor required was reduced by 19,075 gallons per day, or 8,500 gallons per cook, and 2.18 fewer cooks per day; (3) the amount of cooking steam required was reduced by 67,600 pounds per day, or 31,000 pounds per cook, and 2.18 fewer cooks per day; (4) 1,216 gallons per day of fuel oil, or 1,703 therms of natural gas, were saved; (5) black liquor solids were reduced by 46 tons per day; (6) the amount of pulp mill defoamer required was reduced from 2.4 pounds per ton to 1.75 pounds per ton; (7) the amount of paper mill acid required to offset the soda carryover was reduced by 2.5 pounds per ton; and (8) with the exception of high-size export runs, paper mill defoamer usage was reduced by 23%. Washer operation improved measurably as evidenced by a 30% reduction in brown stock washer defoamer requirements and a reduction in soda loss.

The tests described in Example 7 were performed on paper produced from the runs of Example 9 and the results are indicated in Table 2 below.

TABLE 2

|  | MULLEN | ZDT | POROSITY | SMOOTH-NESS | STFI |
|---|---|---|---|---|---|
| Without Example 1 | 98.2 | 48 | 16.3 | 397 | 20.2 |
| With Example 1 | 101.1 | 53 | 15.5 | 400 | 21.8 |

EXAMPLE 10

During another run of the Kraft pulping process as described in Example 3, the composition of Example 1 was added into a white liquor cooking medium with raw pine chips. As with the previous Examples, the addition of the present additive of Example 1 was compared with the pulping process at the mill when no additive was included. The composition of Example 1 was added to the chips at a rate of 3 pounds per ton of wood chips. The Kappa numbers for the run with the additive was 29.80 and without the additive was 32.55. The percent of 0.01" flat screen rejects with the additive was 1.55% and without the additive was 1.89%.

EXAMPLE 11

The composition of Example 1 was also added to soft pine chips and compared with a cook without any additive. The Kappa number of the paper with the additive was 28.00 and without the additive was 27.93. The amount of 0.01" flat screen rejects when the composition of Example 1 was used were 0.38% and without the additive were 1.19%. The viscosity of the cooking medium with the additive was 22.50 sec. ced and without the additive was 20.55 sec. ced.

EXAMPLE 12

The composition of Example 1 was also utilized to cook soft hardwood pulp. The Kappa number for the hardwoods with the additive was 14.10 and without the additive was 15.10. The amount of 0.01" flat screen rejects for both cooks was 0.10%. The viscosity of the cooking medium with the additive was 12.62 sec. ced and without the cooking additive was 11.45 sec. ced.

The viscosity noted for Examples 11 and 12 above provides a measurement of the cellulosic fiber length. In normal cooks without using the present inventive additive, viscosity rises and falls with a rise and fall in the Kappa numbers. Higher viscosity numbers indicate the presence of longer fibers which result in stronger paper. As indicated in Examples 11 and 12, a drop in Kappa numbers did not necessarily indicate a drop in the viscosity when the present composition was employed.

It should be understood that the present invention is not limited to the specific compositions or processes described herein and that any composition having a formula or process steps equivalent to those described falls within the scope of the present invention. Preparation routes of the composition and process steps for enhancing the cook of wood chips to produce pulp are merely exemplary so as to enable one of ordinary skill in the art to make the composition and use it according to the described process and its equivalents. It will also be understood that although the form of the invention shown and described herein constitutes a preferred embodiment of the invention, it is not intended to illustrate all possible forms of the invention. The words used are words of description rather than of limitation. Various changes and variations may be made to the present invention without departing from the spirit and scope of the following claims.

What is claimed is:

1. A composition for adding to a process for cooking wood to form pulp to enhance the uniformity of the cook and reduce pulp rejects, said composition comprising esters made by reacting a fatty acid having from about 4 to about 22 carbon atoms with one or more block polymers having the general formula

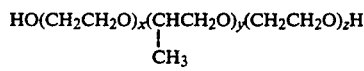

wherein x, y, and z each have a value of at least one, the molecular weight of said block copolymers is in the range of from about 500 to about 30,000 and the polyethylene oxide portion of said block copolymers comprises from about 20% to about 80% of said block copolymer.

2. The composition as defined in claim 1, wherein one of said block copolymers has a molecular weight of about 2,500 and has a polyethylene oxide portion comprising about 20% by weight of said copolymer and another of said block copolymers has a molecular weight of about 12,600 and has a polyethylene oxide portion comprising about 70% by weight of said copolymer.

3. The composition as defined in claim 1 wherein one of said block copolymers is present in said composition in an amount of about 45% by weight of said composition and another of said block copolymers is present in said composition in an amount of about 45% by weight of said composition.

4. The composition as defined in claim 6 wherein said esters comprises oleates.

5. The composition as defined in claim 1 wherein one of said block copolymers has a molecular weight of about 12,600 and another of said block copolymers has a molecular weight of about 2,500 and said fatty acid is chosen from the group consisting of oleic acid, linoleic acid, adipic acid, abietic acid maleic acid and stearic acid.

6. The composition as defined in claim 1 wherein said esters comprise carboxylic acid esters.

7. A composition for adding to a process for cooking wood to form pulp to enhance the uniformity of the cook and reduce pulp rejects, said composition consisting essentially of esters made by reacting a fatty acid having from about 4 to about 22 carbon atoms with one or more block copolymers having the general formula

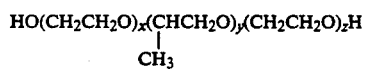

wherein x, y, and z each have a value of at least one, the molecular weight of said block copolymers is in the range of from about 500 to about 30,000 and the polyethylene oxide portion of said block copolymers comprises from about 20% to about 80% of said block copolymer.

* * * * *